UNITED STATES PATENT OFFICE 2,684,043

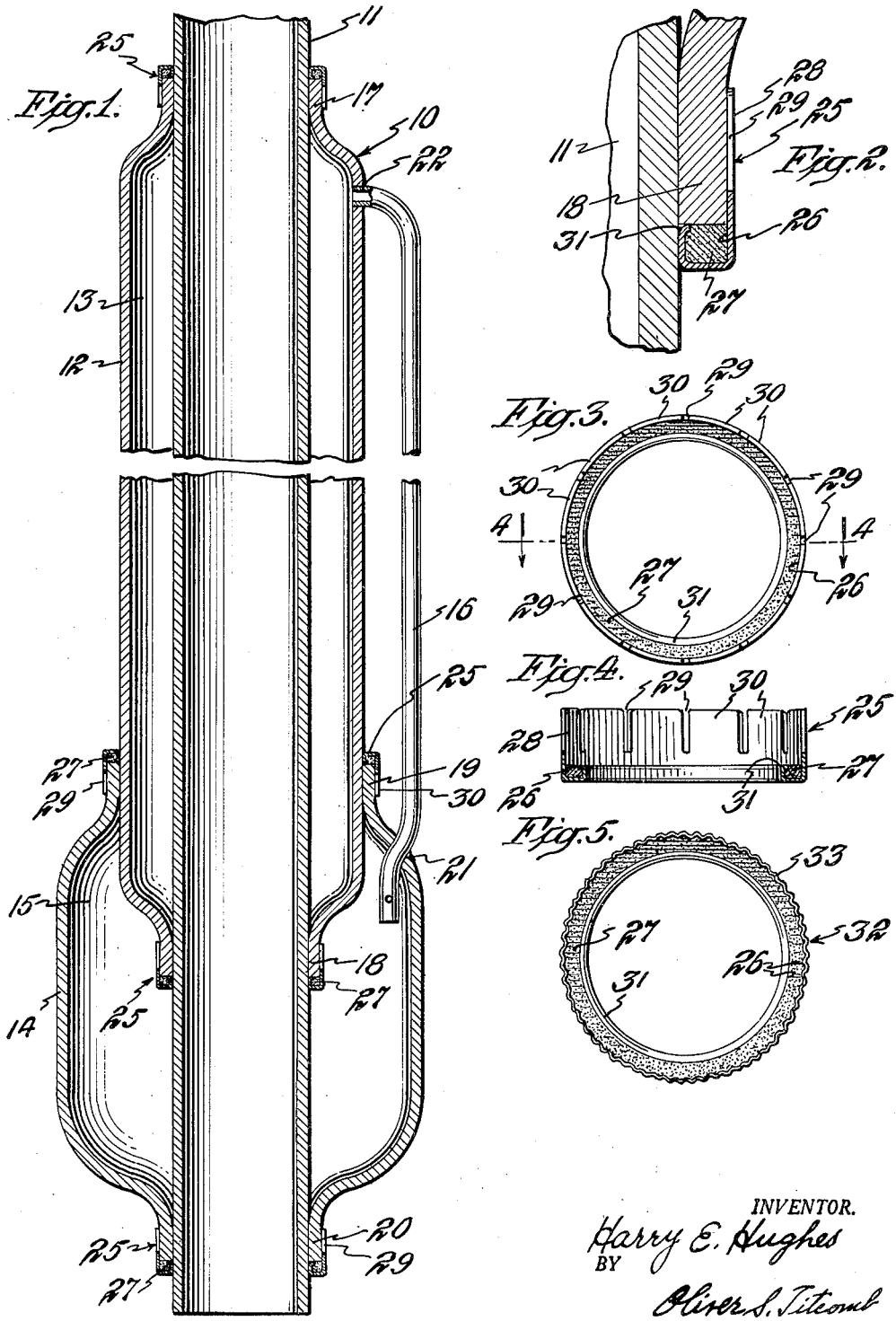

BRAZING FITTING

Harry E. Hughes, Evansville, Ind., assignor to Servel, Inc., New York, N. Y., a corporation of Delaware Application March 30, 1949, Serial No. 84,346

4 Claims. (Cl. 113—110)

The present invention relates to brazing joints between metal parts, such as slip joints between tubes, and more particularly to a fitting for holding brazing material adjacent the joints to be bonded.

When two metal parts are soldered or brazed with copper or a similar soft material, the brazing material may be wrapped around or otherwise formed to closely fit the joint. If the parts are to be brazed with brazing material in powdered form the brazing material may be mixed with a suitable binder to form a paste and the paste applied to the joint or the powder may be compacted into briquettes of a shape to fit the joints. Such methods of applying the brazing material have been found to be satisfactory if proper care is given to its application. However, when the brazing material is applied in mass production it is difficult to obtain the care and attention necessary to insure the application of the proper amount of brazing material closely adjacent the joints, especially if the parts are relatively movable or the joints are enclosed and hidden from view.

One of the objects of the present invention is to provide a fitting for positively holding the proper amount of brazing material adjacent the joint to be bonded.

Another object is to provide a fitting of the type indicated having a recess which conforms to the contour of the joint with powdered brazing material compacted in the recess.

Still another object is to provide a fitting of the type indicated which is adapted to slip over and frictionally engage one of the parts to position and positively hold the brazing material adjacent the joint to be bonded.

These and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claims. In the drawing:

Fig. 1 is a longitudinal sectional view of the parts of a generator for an absorption refrigeration system and showing the fitting of the present invention applied to each of the joints to be bonded for holding the proper amount of brazing material closely adjacent thereto;

Fig. 2 is an enlarged sectional view of one of the joints and showing the powdered brazing material held in a pocket of the fitting adjacent the joint to be bonded;

Fig. 3 is a plan view of the fitting showing its circular form and the annular pocket of brazing material therein;

Fig. 4 is a transverse sectional view on line 4—4 of Fig. 3 and showing the peripheral spring fingers adapted to slip over and frictionally grip the end of a tube or pipe; and Fig. 5 is a plan view of a fitting of modified construction having its side wall crimped to provide a resilient ring for gripping one of the parts to be bonded.

In the drawing the fitting of the present invention is shown applied to each of the joints between a plurality of separate parts of a generator 10 to adapt them to be joined into an integral structure by a single brazing operation. The parts of the generator 10 comprise a central tube 11 constituting a flue for combustion products, a shell 12 spaced from the tube 11 to provide an annular chamber 13 therebetween, a shell 14 surrounding and spaced from the tube 11 and shell 12 to provide a vapor lift chamber 15 and a vapor lift tube 16 connecting the chamber 15 to the chamber 13. The shell 12 is in the form of a tube having ends of reduced diameter to provide annular flanges 17 and 18 adapted to closely fit the outer periphery of the flue tube 11. The shell 14 also is in the form of a tube having its upper end reduced to provide a flange 19 adapted to closely fit the outer periphery of the shell 12 and its lower end reduced to provide a flange 20 adapted to closely fit the outer periphery of the flue tube 11 adjacent its lower end. The vapor lift tube 16 has a reversed bend at its lower end which projects through a hole 21 in the shell 14 and into the upper end of the chamber 15. The upper end of the vapor lift tube 16 is bent at right angles and projects through a hole 22 in the shell 12 adjacent its upper end. In fabricating the generator 10 the parts are assembled and held in their proper position by suitable fixtures.

In accordance with the present invention, a fitting 25 is applied to one or more of the joints during assembly to positively hold the proper amount of brazing material adjacent the joint or joints. The fitting is particularly adapted for use with enclosed or hidden joints such as the joint between the flange 18 at the lower end of the shell 12 and the flue tube 11 but may be applied to any or all of the joints. As illustrated in Fig. 1, a fitting 25 is applied at each joint during assembly to adapt all of the parts to be united by a single brazing operation.

Each fitting 25 has an annular recess or pocket 26 at one end containing the brazing material 27 and a yielding resilient portion 28 at its opposite end adapted to slip over and frictionally engage the end of one of the tubes to be bonded. In the embodiment of the invention illustrated in Figs. 1 to 4, each fitting 25 comprises a sheet metal tube having one end folded inwardly and then axially to provide the annular trough or pocket 26. The opposite end of the fitting has a series of arcuately spaced longitudinal slits 29 to provide a series of yielding spring fingers 30 between the slits. The fitting is so proportioned as to adapt it to slip over the outer tube, such as the flange 18 of shell 12, and engage the annular trough or pocket 26 with the end of the flange adjacent the slip joint between it and the flue tube 11.

The brazing material 27, if in powdered form, is compacted in the annular recess or pocket 26 to provide a self-sustained briquette therein. While other forms of brazing material may be used the fitting is particularly adapted for brazing material in powdered form which is compacted in the pocket 26 at high pressure. This compacting operation may be accomplished by inserting the fitting 25 in a suitable die to support the folded end of the fitting constituting the annular pocket 26 and compressing the powdered brazing material in the pocket with a cooperating die. Such a compacting procedure is apt to cause the interior of fitting to be compressed into gripping engagement with male portion of the die and to avoid this difficulty the die is beveled radially outwardly where it engages the axial portion of the fitting at the end of its stroke so as to slightly curl the upper edge 31 outwardly during compression.

To assemble the parts of the generator 10, the shell 12 is first mounted in proper position on the flue tube 11 by sliding it over the end of the latter. A fitting 25 is then applied to each of the flanges 17 and 18 at opposite ends of the shell 12. The fittings 25 are applied to the flanges 17 and 18 by merely telescoping the resilient end portion 28 over the outside of the flange 17 or 18 to engage the annular pocket 26 containing the compacted brazing material 27 with the end of the tube. The spring fingers 30 frictionally engage the flange 17 or 18 to position and positively hold the pocket 26 of compacted brazing material 27 adjacent the slip joint even if the flue tube 11 is moved relatively of the tube 12 after the fitting is applied. The annular pocket 26 is so proportioned as to closely fit the flue tube 11 as well as the flange 18 to provide a capillary space between the top of the pocket and the end of the flange to the joint between the parts and the only care which must be taken is to be sure that the pocket 26 of brazing material 27 is contacted with the end of the flange. The shell 14 is then slid to its proper position over the shell 12 and end of the flue tube 11 and a fitting 25 of proper size applied to each of the flanges 19 and 20. The ends of pump tube 16 are inserted into the holes 21 and 22 of shells 14 and 12, respectively. Brazing material in any suitable form such as a paste or formed briquette of the powdered alloy is applied to the periphery of the pump tube adjacent the holes 21 and 22.

The assembly is then heated to the melting temperature of the brazing material which is drawn by capillary action into the joints between adjacent parts. It has been found that the brazing material flows into and completely fills each of the joints to bond the parts and seal the joints between tubes. Also with the construction illustrated in Fig. 1 of the drawings each of the joints is reenforced by a double thickness of tubing which prevents bending at the joints.

In Fig. 5 a fitting 32 of modified construction is illustrated having its side wall crimped or corrugated to provide a resilient ring 33 adapted to slide over and frictionally engage the end of one of the tubes to be connected. The construction illustrated in Fig. 5 otherwise is the same as that illustrated in Figs. 2 to 4 and the pocket 26 of brazing material 27 is formed by folding one end of the fitting inwardly and axially as previously described.

It will now be observed that the present invention provides a fitting for positively holding the proper amount of powdered brazing material adjacent the slip joint between tubes to be bonded. It will still further be observed that the present invention provides a fitting having a recess containing powdered brazing material compacted therein which conforms to the contour of the joint to be bonded. It will still further be observed that the present invention provides a fitting which is adapted to be easily and quickly applied and which frictionally engages one of the parts to position and positively hold the brazing material closely adjacent the joint to be bonded.

While two embodiments of the invention are herein illustrated and described, it will be understood that further modifications may be made in the construction and arrangement of parts without departing from the spirit or scope of the invention. Therefore, without limitation in this respect, the invention is defined by the following claims.

I claim:

1. A fitting for holding powdered brazing material adjacent the slip joint between two telescoped tubes, said fitting comprising a tubular member having one end slitted longitudinally to provide spring fingers and the other end folded inwardly and axially to provide an annular pocket, and a self-sustained briquette of powdered brazing material compacted in the pocket, the outer wall of the fitting being adapted to closely fit the outer tube and the inner wall being adapted to closely fit the inner tube, and the fitting being applied to the joint by sliding the spring fingers onto the outer tube to position and hold the pocket of powdered brazing material adjacent the joint.

2. A fitting for holding powdered brazing material adjacent the slip joint between two telescoped tubes, said fitting comprising a tubular member having one end crimped to provide a resilient ring and the other end folded inwardly and axially to provide an annular pocket, and a self-sustained briquette of powdered brazing material compacted in the pocket, said fitting being applied to the joint by sliding the crimped end over the outer tube to position and hold the pocket of brazing material adjacent the joint.

3. A fitting for holding brazing material for capillary flow into the slip joint between two telescoped tubes, said fitting comprising a tubular wall having an inwardly directed flange closely fitting the outer periphery of the inner tube to provide an annular pocket, powdered brazing material compacted in the annular pocket, and a resilient clip projecting from the tubular wall for frictional engagement with the periphery of the outer tube to hold the brazing material in capillary relation to the slip joint between the telescoped tubes.

4. A fitting for holding brazing material for capillary flow into the slip joint between two telescoped tubes, said fitting comprising a tubular member having a resilient portion at one end to frictionally engage the outer tube and with its wall at the other end folded inwardly to provide an annular pocket between the inner and outer tubes, and an annulus of brittle brazing material secured in the pocket, the resilient portion of the fitting engaging the periphery of the outer tube to hold the brazing material in the pocket in capillary flow relation to the slip joint between the two telescoped tubes.

References Cited in the file of this patent

UNITED STATES PATENTS

| Number | Name | Date |
|---|---|---|
| 235,834 | White | Dec. 21, 1880 |
| 398,582 | Cowen | Feb. 26, 1889 |
| 490,204 | Hunter | Jan. 17, 1893 |
| 648,475 | White | May 1, 1900 |
| 654,875 | Cook | July 31, 1900 |
| 692,462 | Lindemeyr | Feb. 4, 1902 |
| 703,528 | Brewington | July 1, 1902 |
| 791,778 | Heath | June 6, 1905 |
| 807,656 | Buchanan | Dec. 19, 1905 |
| 1,451,429 | Lontz | Apr. 10, 1923 |
| 2,151,334 | Rockefeller | Mar. 21, 1939 |
| 2,209,572 | Lewis | July 30, 1940 |
| 2,312,579 | O'Brien | Mar. 2, 1943 |
| 2,380,071 | Planett | July 10, 1945 |
| 2,487,001 | Taylor | Nov. 1, 1949 |

FOREIGN PATENTS

| Number | Country | Date |
|---|---|---|
| 21,410 | Australia | Oct. 3, 1935 |
| 505,233 | Great Britain | May 8, 1939 |